(12) United States Patent
Crooks et al.

(10) Patent No.: US 11,270,559 B2
(45) Date of Patent: Mar. 8, 2022

(54) SCANNER WITH PROJECTED HUMAN INTERFACE

(71) Applicant: NCR Corporation, Atlanta, GA (US)

(72) Inventors: John Crooks, Duluth, GA (US); Bayapu Reddy Vaddemanu, Kadapa (IN); Chandra Mouli Ayyappa Yellapu, Hyderabad (IN)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 17/245,095

(22) Filed: Apr. 30, 2021

(65) Prior Publication Data
US 2021/0248880 A1    Aug. 12, 2021

Related U.S. Application Data

(63) Continuation of application No. 16/231,094, filed on Dec. 21, 2018, now Pat. No. 11,030,862.

(51) Int. Cl.
*G07G 1/00* (2006.01)
*G06K 7/10* (2006.01)
*G07G 1/12* (2006.01)

(52) U.S. Cl.
CPC ........... *G07G 1/0009* (2013.01); *G06K 7/109* (2013.01); *G06K 7/1092* (2013.01); *G06K 7/1096* (2013.01); *G07G 1/0054* (2013.01); *G07G 1/12* (2013.01)

(58) Field of Classification Search
CPC .................................................. G07G 1/0009
USPC .......................................................... 235/383
See application file for complete search history.

(56) References Cited

U.S. PATENT DOCUMENTS

| 2006/0077183 A1* | 4/2006 | Studt ....................... G06F 9/542 345/173 |
| 2018/0219824 A1* | 8/2018 | Laller .................. G02B 27/017 |

\* cited by examiner

*Primary Examiner* — Toan C Ly
(74) *Attorney, Agent, or Firm* — Schwegman, Lundberg & Woessner (57) ABSTRACT

Hardware controls associated with features of a scanner are removed, and a combined scanner and transaction terminal is provided without the hardware controls. Operations associated with the removed hardware controls are graphically depicted as selectable window options within scanner-generated windows. The scanner generated windows are provided as a projected human interface for the missing hardware controls. The projected human interface is provided with and accessible from a display that includes transaction windows produced by transaction software of the transaction terminal, such that the selectable window options are always accessible from the display during transaction processing performed by the transaction software.

19 Claims, 7 Drawing Sheets

SCANNER WITH PROJECTED HUMAN INTERFACE

CROSS-REFERENCE TO RELATED APPLICATION

This application is a continuation of U.S. patent application Ser. No. 16/231,094, filed Dec. 21, 2018, which application and publication are incorporated herein by reference in their entirety.

BACKGROUND

Conventional barcode scanner/scales include human interface elements (buttons, lights, etc.) that duplicate hardware elements on the connected Point-Of-Sale (POS touch screen, POS display, buttons, etc.) These hardware elements are manufactured within the scanner/scales and are costly to manufacture; furthermore, the separate hardware elements must be maintained, supported, and serviced when the elements malfunction in some manner.

SUMMARY

In various embodiments, methods and terminal for a projected scanner human interface are presented.

According to an embodiment, a method for a scanner projected human interface is presented, A hardware control associated with a scanner is generated as a selectable option within a scanner window. The scanner window is rendered within a display of a transaction terminal along with transaction windows rendered by the transaction terminal during processing of a transaction.

DETAILED DESCRIPTION

Figure 1:
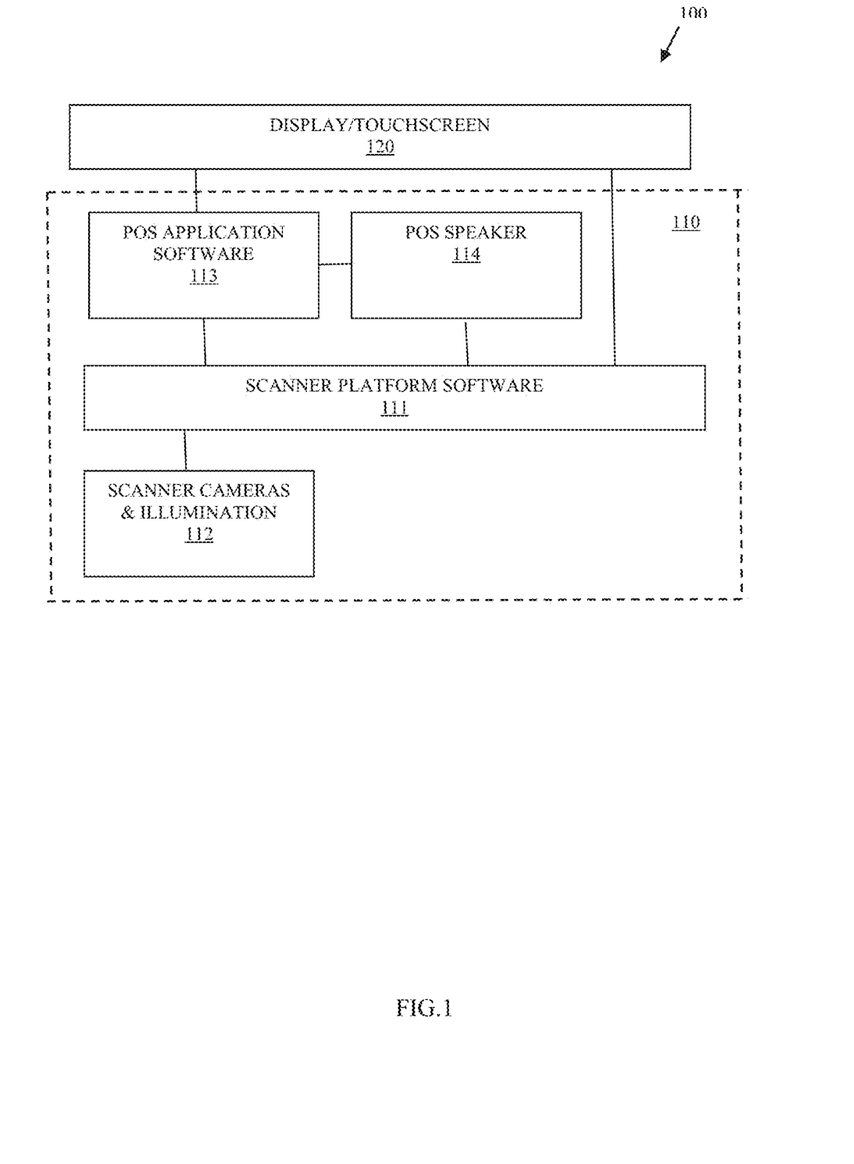
FIG. 1 is a diagram of an architecture for a scanner/scale projected human interface, according to an example embodiment.

FIG. 1 is a diagram of an architecture 100 for a scanner/scale projected human interface, according to an example embodiment. It is to be noted that the architecture 100 is presented in greatly simplified form with just those elements necessary for comprehending the various embodiments presented herein shown. Other architectures with more or less elements and arranged differently may be used without departing from the teachings herein relevant to projecting a scanner's hardware elements within rendered screens of a Point-Of-Sale (POS) terminal connected display as a projected interface and with or without and integrated weigh scale provided with the scanner.

It is to be noted that the term "POS terminal" as used herein can include a cashier-operated/assisted terminal device or a Self-Service Terminal (SST) operated by a customer. A mode of operation between cashier-assisted and self-service can make the POS terminal be cashier-assisted or self-service for transaction processing. A POS terminal may also be used synonymously with the phrase "transaction terminal," herein and below.

Furthermore, the terms and phrases: "customer," "consumer," "user," "service engineer," "technician," and "operator" may be used interchangeably and synonymously herein and is intended to mean the individual operating the transaction terminal at any given point in time for purposes of conducting a consumer transaction and/or providing support services to the transaction terminal.

The architecture 100 includes a motherboard 110 having one or more processors, memory (volatile and non-volatile), a non-transitory computer-readable storage medium, peripheral device drivers for attached peripherals, and peripheral ports for attaching the peripherals. Built into the motherboard 110 is scanner cameras and illumination devices 112, a POS speaker 114, and optionally a scale/weigh plate.

The non-transitory computer-readable storage medium of the motherboard 110 includes executable instructions that are executed by the one or more processors. The executable instructions are represented as the scanner platform software 111 and the POS application software 113.

The scanner platform software 111 and the POS application software 113 process within a same Operating System (OS) that executes on the one or more processors of the motherboard 110. The scanner platform software 111 processes within the OS with a higher priority than that which is assigned by the OS to the POS application software 113.

The higher OS priority of the scanner platform software 111 allows the scanner platform software 111 to force interface screens (windows) associated with accessing human interface components of the scanner/scale on top of or always being present (whether on top or not) within any transaction-based screens being rendered through a transaction interface by the POS application software 113.

The architecture 100 also includes at least one attached display 120, which can be a touchscreen display 120 but does not have to be in some embodiments presented herein. The display/touchscreen 120 is connected to a peripheral port of the motherboard 110. The peripheral port can be any port permitting a connected display 120, such as Universal Serial Bus (USB), High-Definition Multimedia Interface (HDMI), Video Graphics Array (VGA), Digital Visual Interface (DVI), DisplayPort, etc.

A conventional scanner or scanner and scale combination includes a variety of hardware for interfacing directly with the scanner/scale, such as: a scale zero control for zeroing any integrated scale; a camera action or lighting control(s) for the cameras and illumination devices of the camera; a speaker volume control for the scanner; a dedicated motion sensor for waking the scanner/scale when it is asleep; and a dirty window control for detecting when or determining if the scanner windows need cleaned of debris.

These aforementioned hardware human interface controls of a conventional scanner/scale are not present, missing from, and lacking a presence on the motherboard 110. The operations typically associated with these missing hardware controls are rendered as a human interface during normal operation of the POS application software 113 during transaction processing. Thus, the missing human interfaces controls are "virtually" present because the operations performed by these missing interfaces controls are physically missing from the motherboard 110 but are present via interface screens rendered on the display/touchscreen 120.

Some example of these virtual present human interface controls for the scanner/scale rendered within screens are shown and discussed below with the FIGS. 2A-2B and 3.

The software generated human interface controls may be referred to as "options," "elements," and/or "soft keys" herein. Moreover, and as used herein, a "screen" and a "window" may be used interchangeably and synonymously with one another and refer to software-generated visual information that may or may not have human interface provided options that when selected by the operator from a given window cause the visual information to change and/or available options to change in a different window or a same updated version of the given window.

The POS application software 113 causes and/or generates transaction windows during processing within the OS for transactions, and these transaction windows are rendered on the display/touchscreen 120. The scanner platform software 111 may also generate its own windows during transaction processing, which a superimposed on the display/touchscreen 120 or placed on the display/touchscreen so as to be noticeable to the operator during transaction processing of a transaction alongside the POS application software rendered windows. Furthermore, access to the human interface controls for the scanner/scale are always available during transaction processing and accessible to the operator (whether currently viewable from the display 120 in a current view or hidden from a current view on the display 120).

In an embodiment, the soft keys or options rendered in windows by the scanner platform software 111 are said to be always on top for ease of access to the operator. This "always on top" can be performed based on the OS-assigned priority of the windows generated by scanner platform software 111 having a higher priority than the POS application software 113 generated windows.

In an embodiment, the scanner platform software 111 includes one or more window integrators that can adjust configuration files for the options (software rendered versions of the hardware human interface controls missing from the motherboard 110) for purposes of customizing: the font/image sizes of the information provided in the windows having the options, sizes of each window, position of each window within the area provided by the display 120, and behaviors of each window for optimally configured placement and behaviors of the windows so as to unobtrusively always be present (albeit at any given time not always viewable or always on top) to the operator while the transaction windows are being rendered by the POS application software. In an embodiment, the behaviors for windows with the options appear or disappear from a view of the operator of the display 120 based on configured triggers (a view is all the current windows that are viewable from the display 120). For example, scanning a special barcode through the scanner (perhaps situated on an underside of a top plate for the scale), scanning items during a transaction, after initiating calibration, or when the camera 111 of the scanner detects gestures of the operator indicating the operator is having difficulty locating a bar code for an item during a transaction (operator detected as "fishing" for an item barcode during the transaction processing).

In an embodiment and based on the transaction state for a transaction being processed by the POS application software 113, the window or windows having the options (software rendered soft keys for the missing hardware controls from the motherboard 110) are raised to the top of all transaction windows for immediate viewing and access by the operator on the display 120.

In an embodiment and based on the transaction state for a transaction being processed by the POS application software 113, the window or windows having the options are hidden from being viewed on the display (120). In these embodiments, even though the options are hidden they are always accessible to the operator.

During initial configuration of the architecture 100, scanner cameras & illumination drivers are installed on the motherboard 110 first. During configuration, the windows generated by the scanner 112 are assigned an "always on top" priority with the OS. These scanner-generated windows are provided by the drivers when an item is scanner during transaction processing. The windows include images, text, graphical illustrations, and buttons (for the operator to provide selections or access features being provided by the drivers). The above-mentioned integrators can be used for optimal sizing, positioning, and behaviors of such driver-generated windows during transaction processing relative to the transaction windows being generated by the POS application software 113. The integrators can further be used to modify the behavior of the always on top priority assigned during installation of the drivers by hiding the windows when appropriate to do so or placing the windows in currently unoccupied areas or the display 120 (unoccupied in that no existing or current transaction-rendered window is present in the area identified as an unoccupied area of the display 120).

Figure 2A:
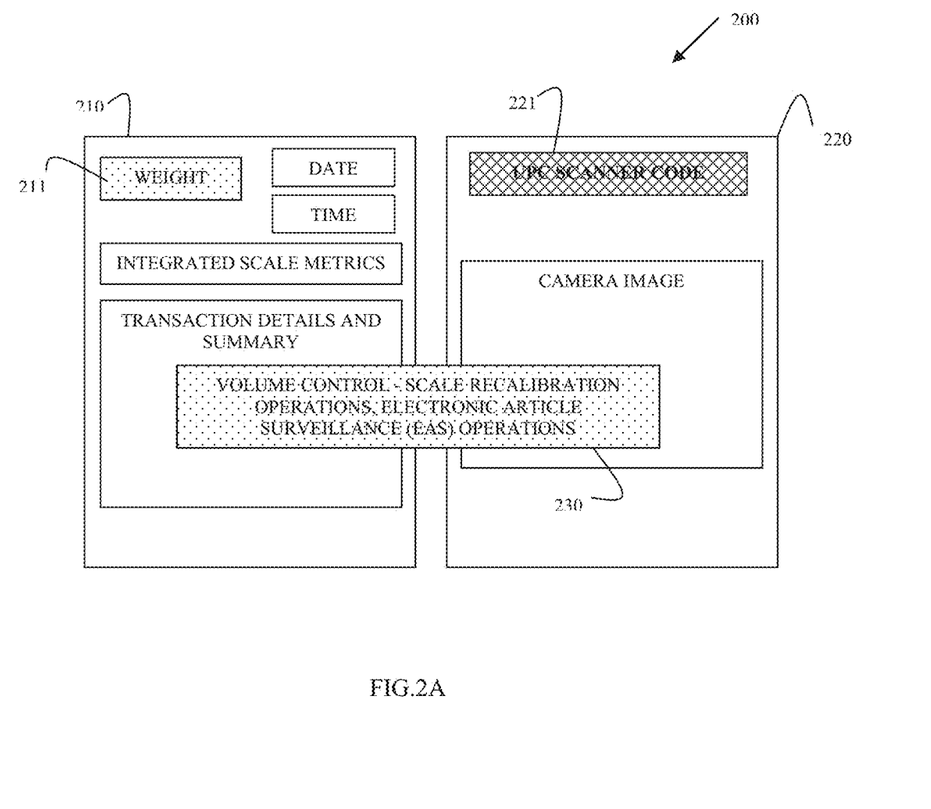
FIG. 2A is a diagram an example projected human interface screen rendered on a POS display for a combined scanner/scale, according to an example embodiment.

An example window produced when an item is weighed on a weigh scale/plate for an integrated scanner/scale is shown in the FIG. 2A as window 210. Window component 211 of window 210 shows a live (real-time) weight value produced by the weigh scale/plate for an item weighed on the scale during a transaction. 211 is also colored in a distinct color that is known to be associated with the scale, such as "blue" or any color that allows rapid visual distinction by the operator that the window 210 is associated with the scale.

An example window produced for an item that is scanner by a scanner/camera is shown as window 220. Window component 221 of window 220 shows a UPC scanner code of the item scanned by the scanner/camera during a transaction. Component 221 is colored a different color from that which was associated with 211. Again, this allows the operator to associate the color of 211 with the scale and the color of 221 with the scanner, such that the operator knows the drivers of scanner/scale produced the windows 210 and 220 and the operator can quickly discern which window 210 or 220 is associated with which device, scale or scanner.

Also illustrated in FIG. 2A, a window 230 is generated and rendered by the scanner platform software 111. The window 230 includes soft keys or options for activating the scanner platform software 111 to process operations associated with one of the missing hardware controls that are missing a physical presence from the motherboard 110. The soft keys or options are user-activated as needed by the user by selecting one of a plurality of options that include: speaker 114 volume control (up and down), scale zero, and Electronic Article Surveillance (EAS) operations (such as deactivating a security tag on an item, etc.). Activation by the user of EAS may itself cause a window to be generated with available options associated with EAS.

Each of the illustrated windows 210 and 220 of the FIG. 2A may include a variety of information associated with actions performed by the scale and the scanner, the subject matter of these components are identified for the window 210 as: date, time, integrated scale metrics for the scale, transaction or item details with a summary; a real-time image 222 (as shown in the FIG. 23) for an item tin the process of being scanned by the scanner. Other components with other information may be present as well depending upon the driver functionality of the drivers for the scale/scanner.

The FIG. 23 also illustrates that the image and an area surrounding the item barcode that was scanned by the scanner may be highlighted with a box 223 within the image 222 presented in window 220.

Also during initial configuration, the audio interface associated with audio usually provided through an independent speaker of a conventional scanner/scale is adjusted to it audibly integrates with audio produced by the POS application software 113, Here, the audio volume produced by the scanner/scale is set independent of the POS application software-produced audio to achieve emulation of the independent volume control associated with the audio options of the scanner/scale that is independent of audio produced by the POS application software 113. That is, any adjustments made by the operate the scanner volume associated with beeps from scanning (from using the volume up and down options provided in window 230) only adjusts the scanner beep volume and does not adjust the POS keyboard audio feedback volume for the POS. Configuration can include using the OS's provided audio mixing capability to mix scanner audio with POS application software-produced audio and any OS-provided audio feedback provided by the OS The scanner platform software 111 can render the visual elements of the options in a variety of manners within window 230. For example, rendering the options as buttons that always appear together within a single rendered window 230 and set to be "always on top." Each button (option) may invert or show a colored dot next to that button to indicate the button was pressed (to provide visual feedback to the operator). Activation of the buttons from window 230 by the operator produces the same audio feedback sound played through the POS speaker 114 as what would have been produced and played out of a conventional scanner's speaker if the user had used a physical hardware control to adjust the conventional scanner's audio feedback. At least one button appears in window 230 for beep volume and timbre, scale zero (0), and EAS activation.

Figure 2B:
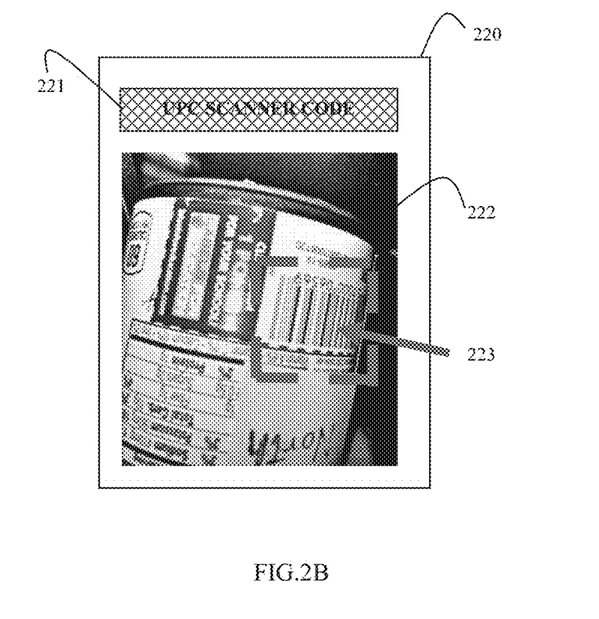
FIG. 2B is a diagram of an example, projected human interface screen rendered with a live camera image on the POS display for the combined scanner/scale, according to an example embodiment.

The scanner platform software 111 can also modify the driver-supplied/rendered windows before rendering such windows on the display 120 to provide and convey a variety of information regarding the scale and the scanner to the operator during transaction processing (so the windows provided by the drivers of the scanner and scale can be modified from what is illustrated in the FIGS. 2A and 2B as windows 210 and 220).

For example, the scanner platform software 111 may change scan window 220 such that a changing colored bar or oval shaped bar depicts the scanner status; optionally, with a text description such as "item scanned," "scanner disabled," "scale error N (any specific scale error code)," and others may be rendered with or without the changing colored bar. The scanner platform software 111 may also render window 220 as a transparent or see-through window 220, such that color associated with the status is visible while other transaction windows are being viewed and worked on by the operator. The size and shape of windows 210 and 220 may also be changed dependent on activity occurring for the transaction. For example, the status bar is rendered temporarily as a non-persistent but large green bar that persists within window 220 for a configured period of time (such as 1 second), but any disabling of the scanner creates a persistent thin red line that will not disappear from the windows on the display 120. Also, the red and green status will still blink on the surface of the scanner (light bunt into the scanner housing), such that the operator can still receive visual feedback when not viewing the display 120 or when not looking at the area of the display 120 that the scanning status bar is rendered.

The scanner platform software 111 can modify window 210 in a variety of customized manners as well. A changing colored bar may be rendered within window 210 depicting adjacent to the current weight of an item being weighed. The colors can be associated with status known for the scale and/or provided with text descriptions, such as "unstable error," "below-zero," "calibration-in-progress," "calibration statistics," etc. Optionally, clear written descriptions may be provided with the current weight, such as "Scale detects negative weight—clean top plate and press scale zero."

Moreover, scale regulations normally require the scale live weight display to be always visible. However if the POS application software 113 already has a built-in live weight scale display, the projected always-on-top scale display may be disabled so it never appears. However, this is not the case for scale error codes, since typically POS software with built-in scale display capabilities is not normally capable of displaying scale error codes.

Furthermore, the scanner platform software 111 sets the POS speaker 114 to always be on, since it plays scanner beeps, scale zero conditions, and provides a variety of voice prompt sounds.

In an embodiment, motion sensing by the scanner is detected passively through activity associated with the keyboard. So, the scanner is configured to sleep until the scanner platform software 111 detects keyboard activity at which point the scanner platform software 111 wakes the scanner up for processing. In a similar matter, lack of activity on the keyboard is an indication for the scanner platform software 111 to put the scanner in sleep mode.

The scanner platform software 111 also shows live video feedback from the scanner cameras in an always-on-top window (as shown in FIG. 23 window 220 and window component 222). However, such always-on-top window may be modified such that it is only visible on top when the barcode for the scanned item is not in the POS application software item database such that no match is made. The POS may prompt the user to "pose" the item on the scanner top plate with guidance from the live video display, and press a POS button to capture a still image of the item for later use when adding the scanned item to the item database. Live video display can also appear to help guide the operator when they are having trouble scanning an item. The scanner can also detect such trouble by looking for operator "fishing" motions using image processing techniques, and automatically turning on live video display when the scanner/scale detects that the operator is having scanning trouble. The scanner/scale can also provide spoken and written guidance along with the live video display, for example "make sure the barcode is visible on the display."

Furthermore, the scanner platform software 111 shows a "clean window" message or icon in an always-on-top indicator window.

The human interface soft keys/options provided in windows generated by the scanner platform software 111 appear and disappear based on behaviors. These behaviors can be defined in an ".xml" format configuration file. These behaviors may include: ALWAYS VISIBLE: if the POS application software-generated transaction windows have space, the scanner/scale human interface soft keys/options can always be visible. The soft keys/options that use this behavior can include buttons, scan advisor, scale display, speaker, motion detection, and live video display.

In an embodiment, a behavior may include NEVER VISIBLE. Though unusual, some retailers may elect not to show certain soft keys/options. For example, some retailers do not want cashiers to adjust scanner volume or tone. Soft keys/options that use this behavior can include buttons, scan advisor, live video display, and clean window indicator.

In an embodiment, a behavior may include SINGLE BUTTON OR GESTURE, where pressing a single always-on-top touch-screen button, dedicated keyboard button, or dedicated scanner tower button makes the rest of the soft keys/options appear. Alternatively, a touch screen "swipe" motion from the bottom of the POS terminal touch display 120 to the top makes the soft keys/options appear. Soft keys/options that use this behavior can include buttons, scan advisor, and live video display.

In an embodiment, a behavior may include ACTIVITY, where the soft key/option appears after a period of scanner or scale inactivity, and then disappears after the operator starts scanning or scaling (buttons for example). Or alternatively, the soft key/option disappears after inactivity, and appears after the operator starts scanning (scan advisor for example). Human interface soft keys/options that use this behavior can include buttons, scan advisor, and live video display.

In an embodiment, a behavior may include SCALE CALIBRATION, pressing a dedicated hardware scale calibration button on the scanner/scale makes applicable soft keys/options appear in preparation for calibration, for example the scan advisor and buttons. The scale calibration button is typically embedded inside the scale assembly and protected by a lead seal. In case of the scan advisor, the soft key/option displays "bar graph" feedback to indicate when the user exercises (presses hard on) the scale top plate during calibration. Soft keys/options that use this behavior can include buttons and scan advisor.

In an embodiment, a behavior includes CHANGE OF STATE, where the soft keys/options appear for a fixed period of time, for example 1 second, when the scanner state changes. Examples of scanner state changes include: POS disables the scanner; and scanner wakes due to motion. Soft keys/options that use this behavior can include buttons, scan advisor, and live video display.

In an embodiment, a behavior includes EXCEPTION CONDITION, where when the scanner detects an exception condition, it displays the corresponding soft key/option. Example exception conditions include: scale in negative weight condition; EAS system cannot be detected; camera is offline; operator needs help capturing an image of an item that is not-on-file; operator is having trouble scanning a barcode; and window is dirty. Soft keys/options that use this behavior can include buttons, scan advisor, live video display, and clean window indicator.

In an embodiment, the display is not a touch display, and instead a keyboard and/or a mouse are used to access the soft keys/options.

Instead of, or in addition to, using the touch screen for scanner/scale control, the scanner platform software 111 may use dedicated keys on the POS keyboard, for example scale zero, volume, and EAS activation.

Figure 3:
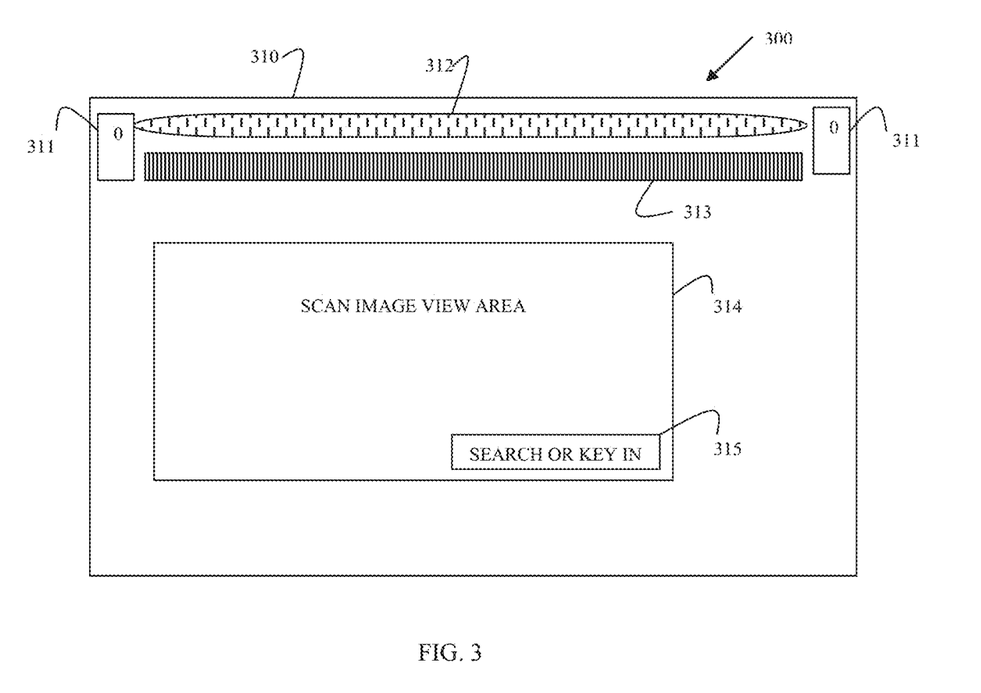
FIG. 3 is a diagram of another example projected human interface screen rendered on a POS display for the combined scanner/scale, according to an example embodiment.

In an embodiment, the driver rendered windows 210 and 220 of the FIGS. 2A and 2B may be modified and rendered as is shown in the FIG. 3 by the scanner platform software 111.

Two window components 311 for scale zero are rendered at the top on both the left and right side of the window 310, components 311 are selectable options (buttons) that cause the scanner platform software 111 to initiate scale zero operations and the scale. Window component 312 is a changing colored and sized scanner status bar, window component 313 is a multicolored scanning error bar for the scanner, window component 314 displays a live image of the item scanned, and window component 315 provides an item number to be searched for or looked up when the item has a non-scanned bar code.

Although, the scanner platform software 111 was labeled as "scanner" herein and above without the term scale, the scanner platform software 111 includes control software associated with an integrated scale as discussed above. Thus, when the scanner integrated into the motherboard 110 includes a scale, all of the above processing discussed with respect to the scale and its options are performed by the scanner platform software 111.

In an embodiment, the motherboard 111 integrates a scanner that lacks an integrated scale. The missing scale may be interfaced to the motherboard 111 as a peripheral attached scale.

These and other embodiments are now discussed with reference to the FIGS. 2-3.

Figure 4:
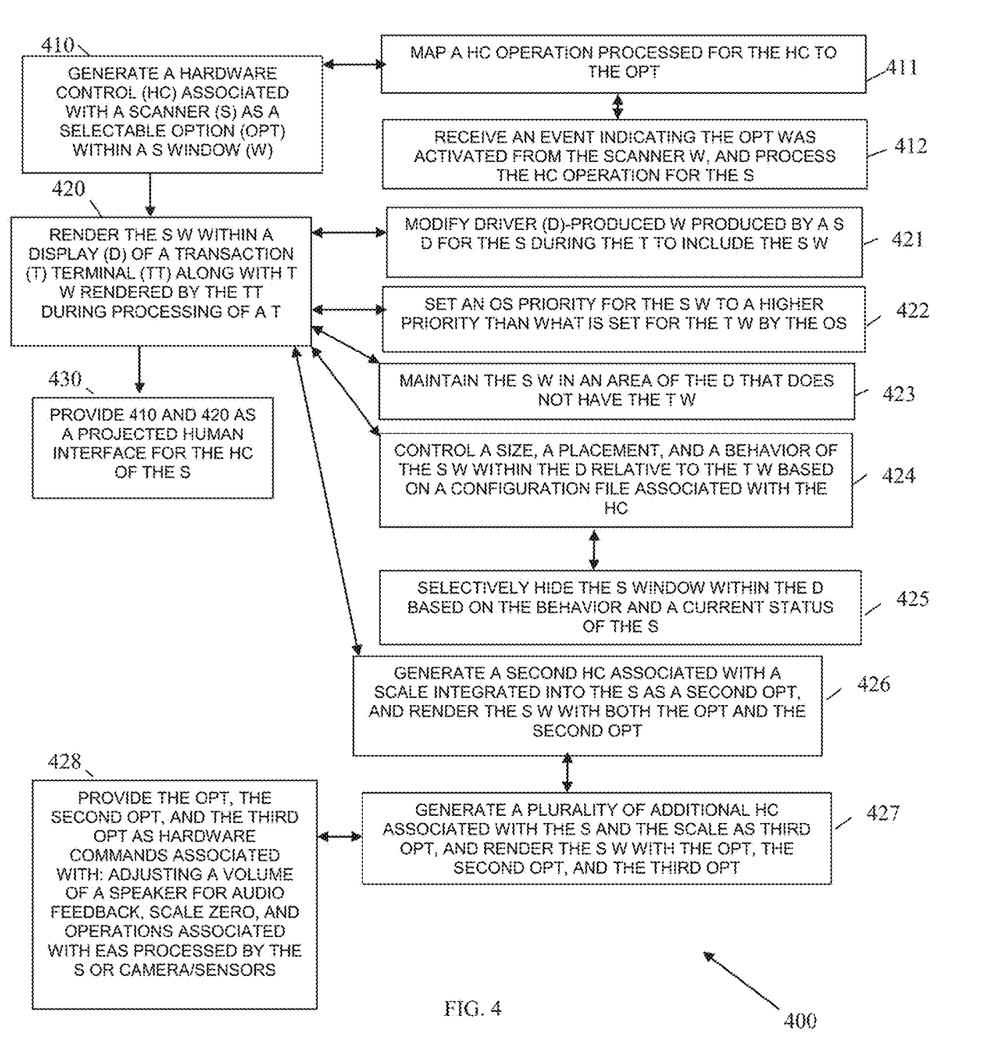
FIG. 4 is a diagram of a method for projecting scanner/scale human interface elements on a POS display, according to an example embodiment.

FIG. 4 is a diagram of a method 400 for projecting scanner/scale human interface elements on a POS display, according to an example embodiment. The method 400 is implemented as executable instructions as a collection of software modules referred to collectively as a "scanner/scale human interface renderer." The executable instructions reside in a non-transitory computer-readable storage medium and are executed from the non-transitory computer-readable storage medium by one or more processors of a transaction terminal. The transaction terminal has access to one or more networks during execution of the scanner/scale human interface renderer by the processor. The networks can be wired, wireless, or a combination of both wired and wireless.

In an embodiment, the transaction terminal that executes the scanner/scale human interface renderer is a combined integrated POS, scanner, and scale terminal represented by the motherboard 110 of the FIG. 1. In an embodiment, the transaction terminal is operated as a cashier assisted terminal for customer transactions. In an embodiment, the transaction terminal is operates as a SST by the customers that check themselves out for transactions.

In an embodiment, the scanner/scale human interface renderer is the scanner platform software 111.

The device that executes the scanner/scale human interface renderer includes at least one primary display/touch-screen 120 interfaced to the device. In an embodiment, the display is a touchscreen. In an embodiment, the display is not touch enabled and at least one keyboard and/or mouse are also attached to the device that executes the scanner/scale human interface renderer when the display is not touch enabled.

At 410, the scanner/scale human interface renderer generates a hardware control associated with a scanner as a selectable option within a scanner window. The selectable option can be any of the soft keys, options, and elements discussed above with the FIGS. 1, 2A-2B, and 3. The physical knobs and devices for the hardware control are missing and not manufactured with the scanner or available on the terminal that executes the scanner/scale human interface renderer.

In an embodiment, at 411, the scanner/scale human interface renderer maps a hardware control operation processed for the hardware control (if the physical hardware control was present for the scanner) to the selectable option.

In an embodiment of 411 and at 412, the scanner/scale human interface renderer receives an event indicating that the selectable option was activated from the scanner window. Responsive to that selection, the scanner/scale human interface renderer processes the hardware control operation for the scanner.

At 420, the scanner/scale human interface renderer renders the scanner window within a display of a transaction terminal along with transaction windows that are rendered by the transaction terminal during processing of a transaction at the transaction terminal. In an embodiment, the transaction terminal is the motherboard 110 and processing performed by the transaction terminal is the POS application software 113.

In an embodiment, at 421, the scanner/scale human interface renderer modifies driver-produced windows that are produced by a scanner driver for the scanner window during the transaction processing so as to include the separate window. Example illustrations of this were provided above with the screens/windows depicted in FIGS. 2A-2B and 3.

In an embodiment, at 422, the scanner/scale human interface renderer sets an OS priority for the scanner window to a higher priority than what is set for the transaction windows by the OS.

In an embodiment, at 423, the scanner/scale human interface renderer maintains the scanner window in an area of the display that does not have any of the transaction windows, such that the scanner window is always visible within the display during the transaction processing.

In an embodiment, at 424, the scanner/scale human interface renderer controls a size, a placement, and a behavior of the scanner window within the display relative to the transaction windows based on a configuration file associated with the hardware control. This was also discussed above with the discussions of the FIGS. 1, 2A-2B, and 3.

In an embodiment of 424 and at 425, the scanner/scale human interface renderer selectively hides the scanner window within the display based on the behavior and a current status of the scanner (such as a status where the scanner successfully scans an item and is fully operational, as was also discussed above).

In an embodiment, at 426, the scanner/scale human interface renderer generates a second hardware control associated with a scale/weigh plate integrated into the scanner as a second selectable option. The scanner/scale human interface renderer renders the scanner window with both the first selectable option and the second selectable option. This was illustrated above in the FIG. 3 with scanner status bar 312 and scale zero operation 311.

In an embodiment of 426 and at 427, the scanner/scale human interface renderer generates a plurality of additional hardware controls associated with the scanner and the scale as third options and renders the scanner window with the selectable option, the second selectable option, and each of the third selectable options.

In an embodiment of 427 and at 428, the scanner/scale human interface renderer provides the selectable option, the second selectable option, and the third selectable options as selectable hardware commands within the scanner window and associated with: adjusting a volume of a speaker for audio feedback, scale zero of the scale, and operations associated with EAS processed by the scanner or camera/sensors of the scanner.

Figure 5:
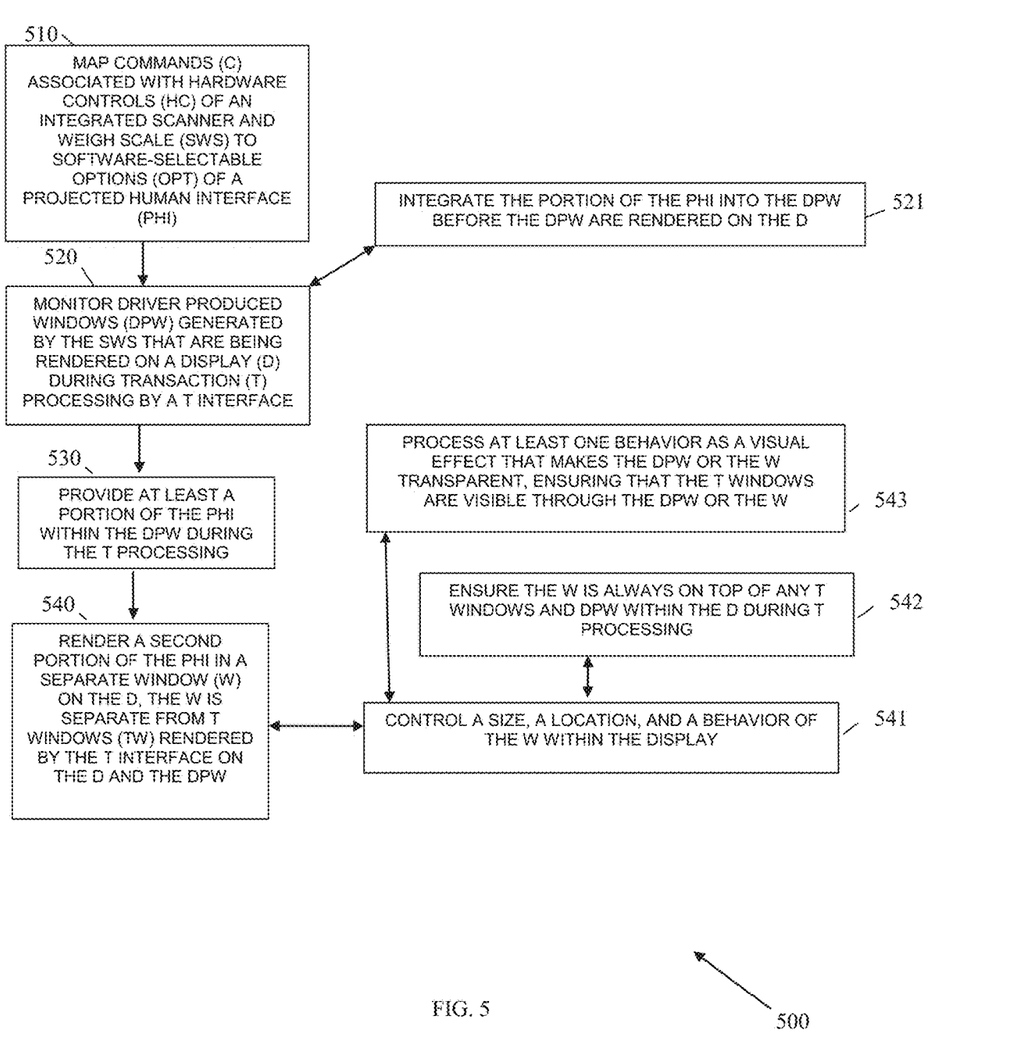
FIG. 5 is a diagram of another method for projecting scanner/scale human interface elements on a POS display, according to an example embodiment.

In an embodiment, at 430, the scanner/scale human interface renderer provides the processing of 410 and 420 as a projected human interface for the hardware control of the scanner, FIG. 5 is a diagram of a method 500 for projecting scanner/scale human interface elements on a POS display, according to an example embodiment. The method 500 is implemented as executable instructions as a collection of software modules referred to collectively as a "human interface projection manager." The executable instructions reside in a non-transitory computer-readable storage medium and are executed from the non-transitory computer-readable storage medium by one or more processors of a transaction terminal. The transaction terminal has access to one or more networks during execution of the human interface projection manager by the processor. The networks can be wired, wireless, or a combination of both wired and wireless.

In an embodiment, the transaction terminal that executes the human interface projection manager is a combined integrated POS, scanner, and scale terminal represented by the motherboard 110 of the FIG. 1. In an embodiment, the transaction terminal is operated as a cashier assisted terminal for customer transactions. In an embodiment, the transaction terminal is operates as a SST by the customers that check themselves out for transactions.

In an embodiment, the human interface projection manager renderer is one of, a combination of or all of: the scanner platform software 111 and/or the method 400.

At 510, the human interface projection manager maps commands associated with hardware controls of an integrated scanner and weigh scale to software selectable options (soft keys, elements, components) of a projected human interface. Projected because the scanner and scale lack the physical controls to initiate the commands for processing and such commands are made available through the interface.

At 520, the human interface projection manager monitors driver-produced windows generated by integrated scanner and weigh scale that are being or attempting to be renders on a display during transaction processing by a transaction interface. In an embodiment, the transaction interface is the POS application software 113.

In an embodiment, at 521, the human interface projection manager integrates a portion of the projected human interface into the driver-provided windows before the driver-provided windows are rendered on the display.

At 530, the human interface projection manager provides at least a first portion of the projected human interface within the driver-provided windows during the transaction processing.

In an embodiment, at 540, the human interface projection manager renders a second portion of the projected human interface in a separate window on the display. The separate window is separate from the transaction windows rendered by the transaction interface on the display and is separate from the driver-provided windows.

In an embodiment of 540 and at 541, the human interface projection manager controls a size, a location, and a behavior of the separate window within the display.

In an embodiment of 541 and at 542, the human interface projection manager ensures that the separate window is always on top of any transaction windows and driver-provided windows during the transaction processing.

In an embodiment of 541 and at 543, the human interface projection manager processes at least one behavior as a visual effect that makes the driver-provided windows or the separate window transparent, which ensures that the transaction windows are visible through the driver-produced windows or the separate window.

Figure 6:
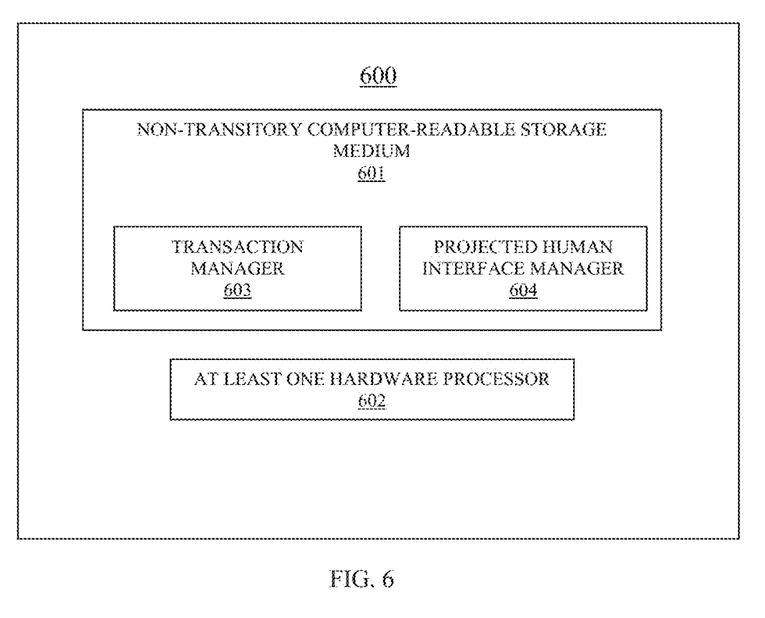
FIG. 6 is a diagram of a terminal for projecting scanner/scale human interface elements on a POS display, according to an example embodiment.

FIG. 6 is a diagram of a terminal 600, according to an example embodiment. The terminal 300 includes a variety of hardware components and software components (firmware). The firmware of the terminal 600 is programmed and reside within memory and/or a non-transitory computer-readable medium and execute on one or more processors of the terminal 600. The terminal during operation has access to one or more networks, which can be wired, wireless, or a combination of wired and wireless.

The terminal 600 implements, inter alia, the processing described above with respect to the FIGS. 1, 2A-2B, and 3-5.

The terminal 600 includes a non-transitory computer-readable storage medium 601 having executable instructions representing a transaction manager 603 and a projected human interface manager 604. The terminal 600 also includes at least one hardware processor 602.

The processor 602 is configured to execute the executable instructions of the transaction manager 603 and the projected human interface manager 604 from the non-transitory computer-readable storage medium 601.

When the transaction manager 603 is executed; the transaction manager 603 is configured to perform processing to: generate transaction windows rendered on a display connected to the terminal 600; and process a transaction being conducted at the terminal 600.

When the projected human interface manager 604 is executed, the projected human interface manager 604 is configured to perform processing to: 1) provide selectable options within separate windows rendered on the display during the transaction, wherein the selectable options represent hardware control operations for an integrated scanner and scale of the terminal 600; 2) ensure the separate windows are visible and accessible from the display during the transaction based on configuration settings for each of the hardware control operations; and 3) process the hardware control operations when activated from the separate windows for the integrated scanner and scale of the terminal 600.

In an embodiment, the integrated scanner and scale is manufactured without physical hardware controls that activate the corresponding hardware control operations.

In an embodiment, the projected human interface manager 604 is all of or some combination of: the scanner platform software 111, the method 200, and/or the method 300.

In an embodiment, the terminal 600 is a POS terminal operated in cashier-assisted mode for checkout transactions or a POS terminal operated in self-service mode for customers self-checking themselves out for the transactions.

In an embodiment, the transaction manager 603 is the POS application software 113.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A scanner, comprising:
 a motherboard comprising a processor and a non-transitory computer-readable storage medium;
 the non-transitory computer-readable storage medium comprising executable instructions;
 the executable instructions when executed by the processor from the non- transitory computer-readable storage medium cause the processor to perform operations comprising:
  delivering hardware control operations to an Operating System (OS) of a transaction terminal as virtual hardware controls; and
  forcing an Operating System (OS) to maintain the virtual hardware controls to rendered on top of any transaction windows within a display of the transaction terminal with a higher OS priority than the transaction windows during operation of the transaction terminal;
 wherein the motherboard lacks physical hardware controls and the hardware control operations of the scanner is provided via the virtual hardware controls to the OS of the transaction terminal.

2. The scanner of claim 1, wherein the physical hardware controls missing from the motherboard comprise: a scale zero physical control.

3. The scanner of claim 2, wherein the physical hardware controls missing from the motherboard further comprises: a camera action or lighting physical control, a speaker volume physical control, and a dedicated motion physical control for waking the scanner when the scanner is asleep.

4. The scanner of claim 3, wherein the physical hardware controls missing from the motherboard further comprises a dirty window physical control for determining when the scanner needs cleaned of debris.

5. The scanner of claim 1, wherein the executable instructions associated with the delivering further includes providing a mapping between each virtual hardware control to a particular one of the physical hardware controls missing from the motherboard to the OS.

6. The scanner of claim 5, wherein the instructions associated with the providing further includes providing a selectable option to activate each virtual hardware control from the mapping to the OS.

7. The scanner of claim 1 further comprises one or more integrated scanner cameras.

8. The scanner of claim 1 further comprises a scale/weigh plate.

9. A transaction terminal, comprising:
a processor;
a non-transitory computer-readable storage medium comprising executable instructions;
an interfaced scanner peripheral device that comprises a motherboard missing physical controls;
the executable instructions when executed by the processor from the non-transitory computer-readable storage medium cause the processor to perform operations, comprising:
maintaining a virtual scanner control window on top of tra nsaction windows generated during transactions at the transaction terminal;
providing selectable options within the virtual scanner control window to access the missing physical controls of the interfaced scanner peripheral device; and
providing an activated selectable option to the interfaced scanner peripheral device to process.

10. The transaction terminal of claim 9, wherein the interfaced scanner peripheral device further comprises an integrated weigh scale.

11. The transaction terminal of claim 9, wherein the executable instructions for maintaining further includes maintaining the virtual scanner control window as a higher priority within an Operating System (OS) of the transaction terminal than the transaction windows.

12. The transaction terminal of claim 9, wherein the executable instructions for providing further includes providing the selectable options within the virtual scanner control window as a scanner driver window produced by a scanner driver for the interfaced scanner peripheral device, wherein the scanner driver loaded within an Operating System of the transaction terminal.

13. The transaction terminal of claim 9, wherein the executable instructions for providing further includes providing the selectable options within the virtual scanner control window as a separate window that is separate from scanner driver windows produced by a scanner driver for the interfaced scanner peripheral device, wherein the scanner driver loaded within an Operating System of the transaction terminal.

14. The transaction terminal of claim 9, wherein the missing physical controls of the interfaced scanner peripheral device comprise: a scale zero physical control, a camera action or lighting physical control, a speaker volume physical control, a dedicated motion sensor physical control for waking the interfaced scanner peripheral device when the interfaced scanner peripheral device is asleep, and a dirty window physical control for determining when a physical scanner window of the interfaced scanner peripheral device needs cleaned of debris.

15. The transaction terminal of claim 9, wherein the missing physical controls of the interfaced scanner peripheral device comprise: a scale zero physical control, a camera action or lighting physical control, a speaker volume physical control, a dedicated motion sensor physical control for waking the interfaced scanner peripheral device when the interfaced scanner peripheral device is asleep, and a dirty window physical control for determining when a physical scanner window of the interfaced scanner peripheral device needs cleaned of debris.

16. The transaction terminal of claim 9, wherein the transaction terminal is a Self- Service Terminal (SST) or a Point-of-Sale (POS) terminal.

17. A method, comprising:
detecting an integrated scanner interfaced to a transaction terminal, wherein the integrated scanner lacks and is missing physical hardware controls from a motherboard of the integrated scanner;
mapping commands for the missing physical hardware controls to virtual hardware controls;
maintaining a projected human interface window comprising selectable options to activate the missing physical hardware controls via the virtual hardware controls on top of any other windows produced and rendered on a display of the transaction terminal; and
passing activated selectable options that are activated from the projected human interface window to a scanner driver for processing by the integrated scanner.

18. The method of claim 17, wherein maintaining further includes maintaining the projected human interface window at a higher priority within an Operating System (OS) of the transaction terminal ensuring that the projected human interface remains on top of the other windows during operation of the transaction terminal.

19. The method of claim 17, wherein maintaining further includes controlling a size, a location, and a behavior of the projected human interface window within the display during operation of the transaction terminal.

* * * * *